United States Patent Office 3,427,273
Patented Feb. 11, 1969

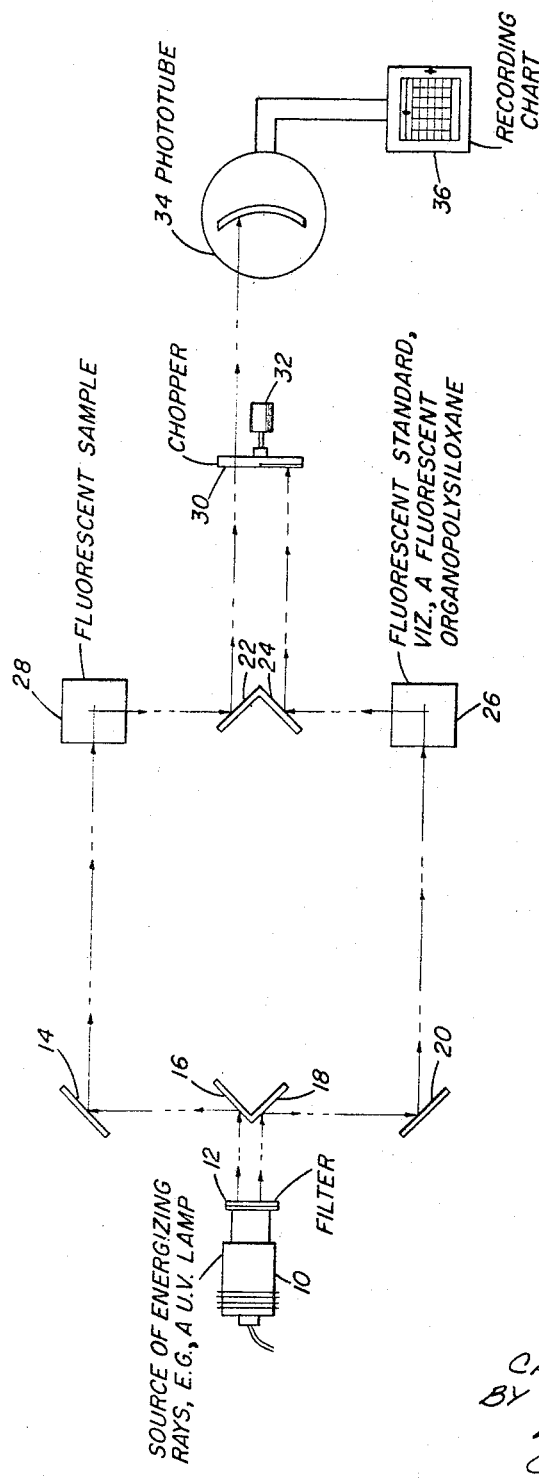

3,427,273
PROCESS FOR MAKING LUMINESCENT ORGANOPOLYSILOXANES AND COMPOSITIONS THEREOF
Charles W. Newing, Jr., Sylvania, Ohio, assignor to Owens-Illinois Glass Company, a corporation of Ohio
Filed Aug. 10, 1964, Ser. No. 388,628
U.S. Cl. 260—30.4
Int. Cl. C09k 1/02; C08g 31/16, 31/09
14 Claims

ABSTRACT OF THE DISCLOSURE

Process for the production of organopolysiloxanes containing monovalent polynuclear aromatic hydrocarbon radicals. The compositions provide a hard fluorescent coating on substrates and generate luminescent emission under energizing radiation.

---

This invention relates broadly to the art of making luminescent (potentially luminescent) devices or articles, and components thereof. More particularly it is concerned with luminescent devices, especially photoluminescent devices, having a source of energizing rays, specifically ultraviolet rays, and a target for conversion of such rays to luminescent emission. This target comprises at least one luminescent organopolysiloxane which is the siloxane condensation product of the hydrolysis product of at least one member of the group consisting of (A) at least one compound represented by the general formula I 

and (B) mixtures of (a) at least one compound defined under (A) and (b) at least one compound represented by the general formula II 

wherein each A in the first-given formula independently represents a monovalent polynuclear aromatic radical, more particularly a monovalent polynuclear aromatic hydrocarbon radical having as many as 16 carbon atoms but preferably such a radical having less than 15 carbon atoms, and each T in the second-given formula independently represents a member of the group consisting of alkyl (including cycloalkyl), alkenyl and aryl radicals having less than 7 carbon atoms, each Z in both formulas independently represents a hydrolyzable group, preferably an alkoxy group (e.g., one that contains from 1 through 7 carbon atoms), $m$ represents an integer selected from the group consisting of 1 and 2, and $n$ represents a positive integer less than 4. A value for $m$ of 3 is not precluded, since such tri-substituted silanes may be used as chain-stoppers in forming luminescent condensation polymers of the compounds embraced by Formula II alone or admixed with mono and/or bis(polynuclear aromatic) compounds embraced by Formula I. The tri(polynuclear aromatic)-substituted silanes are difficult to isolate and, therefore, are costly to produce and less attractive for use in practicing this invention.

It will be understood, of course, by those skilled in the art that some or all of the Z's in Formulas I and II can also represent an —OH group. Hence, the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

In addition to the aforementioned devices and components, the scope of the present invention also includes composition and method features. Some of the composition features are concerned with certain new chemical intermediates that are particularly useful in making luminescent compositions or products of the invention.

Most present commercial luminescent devices use targets composed of polycrystalline phosphors prepared by sintering powdered inorganic reactants selected to provide the necessary host and activator components. The resulting aggregates are ground or otherwise comminuted to a particle size of about one to twenty microns, and then deposited on a substrate. Organic materials are often used as binders to obtain more uniform phosphor deposition, or as membrane coatings for the phosphor to provide a surface that can be aluminized. Several disadvantages attend these processes: comminution adversely affects luminescent efficiency of the phosphors; the phosphors' inherent sensitivity to deterioration by chemical attack is enhanced by their large surface/volume ratio when powdered; uniform contact among phosphor particles and with the substrate is difficult to achieve, and inadequate contact causes light scattering which decreases effective output. Furthermore, phosphor coatings have little abrasion resistance, and binders used in their preparation are subject to thermal deterioration; and, of course, product fabrication techniques are limited to those that do not adversely affect the sensitive phosphor screens. Also, the target is usually opaque, and consequently resolution and definition of a projected image are relatively poor.

[The terms "luminescence" (noun) and "luminescent" (adjective), as used in this specification and/or in the appended claims, are employed according to their ordinary dictionary definition; "luminescence-device" or "luminescent device" means or refers to any apparatus or contrivance by which radiation is converted to luminescent emission; and "target" means the material, regardless of its shape or form, in a luminescent device that effects this conversion.]

Much research and development effort has been expended in recent decades on organopolysiloxanes, and compositions are known that are useful, for example, as lubricants, laminating media, protective films, flexible and rigid moldings, and for other purposes. However, to the best of my knowledge and belief, it was not known prior to this invention to provide luminescent organopolysiloxane materials in fluid, semi-solid or solid form.

The present invention is based on my discovery that luminescent (including potentially luminescent), specifically fluorescent (including potentially fluorescent), organopolysiloxanes can be prepared by introducing into the polysiloxane molecule(s) silicon' atoms having polynuclear aromatic substituents, more particularly polynuclear aromatic hydrocarbon substituents. This discovery was unobvious and unexpected, since it could not have been predicted that such substituents attached to silicon, and especially when the latter is present as a siloxane linkage, would impart fluoroescence in the visible light and/or under ultraviolet (U.V.) light and/or cathodoluminescence to the polysiloxane target.

Many and various practical techniques can be employed for taking advantage of this discovery. For example, the solid, machinable, thermoset, organopolysiloxane resins or structures disclosed and claimed in copending application Ser. No. 306,344 of Alfred J. Burzynski and Robert E. Martin, and assigned to the same assignee as the present invention, may be modified by incorporating therein polynuclear aromatic hydrocarbon substituent bonded directly to silicon, as hereafter more fully described. As a result there is unexpectedly and unobviously imparted to the organopolysiloxane resin luminescence, specifically fluorescence, in the visible and/or ultraviolet light and, also in many if not all cases, cathodoluminescence. By such modifications the invention provides means for producing fluorescent, clear (if desired) and relatively thick, machineable bodies or structure of preselected dimensions and which also are free from interior deformations or voids. Such a unique combination of properties was heretofore unknown in the organopolysiloxane art.

The luminescent organopolysiloxane materials or compositions in which a polynuclear aromatic radical or radicals are directly bonded (i.e., chemically united) to silicon can be produced in fluid, specifically liquid, in semi-solid or, as stated in the preceding paragraph, in solid form. They are useful in such commercial applications as, for instance, fluorescent lights, radiation-detection devices and radar screens; as luminous markers, signs, dials such as those on automotive and airplane panel boards, and the like; and in many other applications that will be immediately apparent to those skilled in the art from the foregoing illustrative examples.

It is accordingly a primary object of the present invention to provide new and improved luminescent devices including components of such devices, specifically targets, in liquid, semi-solid or solid form.

Another main object of the invention is to provide novel and useful luminescent, specifically fluorescent, organo-silicon compounds and, more particularly, organopolysiloxanes.

Another object of the invention is to provide a luminescent, machinable, heat-resistant organopolysiloxane body or structure.

Another object of the invention is to provide certain new chemical intermediates that are particularly useful in making luminescent compositions or products of the invention.

Another object of the invention is to provide a method of preparing the luminescent organopolysiloxanes constituting an embodiment of this invention.

Still another object of the invention is to provide a method for generating luminescent emission by causing energizing radiation to impinge on a target comprising an organopolysiloxane in liquid, semi-solid or solid form.

Still other objects of the invention will be apparent to those skilled in the art from the following more detailed description and the appended claims.

The objects of the invention are attained by producing a luminescent organopolysiloxane, which is a condensation product of a silanol or mixture of silanols (hereafter more fully described). The organopolysiloxanes are often designated by those working in the art as "organopolysiloxane resin" (even though it may be a siloxane condensation product in liquid form), and this nomenclature is sometimes used herein.

The luminescent devices, articles, components, compounds and compositions of the instant invention overcome many of the disadvantages of the prior-art structures or substances just named and which were briefly described and their disadvantages set forth in the fourth paragraph of this specification. This is because there is employed a target comprised of or consisting essentially of a luminescent organopolysiloxane resin. Such resins not only can be made in liquid, semi-solid or solid form as indicated hereinbefore, but they also can be produced in different opacities (transparent, translucent or opaque) to meet the requirements of a particular service application. As liquid, luminescent targets they can be adapted to any convenient shape, or they can be used in a flowing system. As solid targets, they can be cast into a variety of shapes from thin films to bulk articles, e.g., articles that are several inches thick. The concentration of the luminescent component can be readily varied over a wide range, as will be evident from certain parts of the following more detailed description.

In accordance with one embodiment of the present invention, there is provided a luminescent organopolysiloxane prepared by hydrolyzing (A) at least one compound represented by Formula I, $A_mSiZ_{(4-m)}$, alone or together with (B) at least one compound represented by Formula II, $T_nSiZ_{(4-n)}$. In these formulas the various letters have the same meaning hereinbefore given.

When the compounds of (A) and (B) are conjointly hydrolyzed, the molar ratio of reactants may range, for example, from 0.001 mole percent to 99.999 mole percent of the compound of (A) to from 99.999 mole percent to 0.001 mole percent of the compound of (B). The co-hydrolysis product containing silanol groups is then condensed to convert said groups to siloxane linkages. The use of even lower amounts of compound (A) is not precluded, e.g., down to 0.0001 mole percent, based on the total silane reactants, or any smaller amount sufficient to impart luminescence to the final condensation polymer. Generally the amount of the compound of (A) is not more than about 10 mole percent, and usually not more than about 5 mole percent (preferably less), of the total molar amount of (A) and (B) and/or of other or additional co-hydrolyzable and co-condensable reactants. Ordinarily, no particular advantages accrue from using more of the compound of (A) than is necessary to impart the desired luminescent property to the finished organopolysiloxane.

Illustrative examples of groups represented by Z in Formulas I and II include, for example, halogen (chlorine, bromine, fluorine and iodine), alkoxy (e.g., methoxy through heptoxy), and acyloxy (e.g., acetoxy, propionoxy, butyroxy, pentanoxy, hexanoxy, etc.), and aryloxy, e.g., phenoxy. In particular, alkoxy groups are preferred because their hydrolysis products are less acidic, and therefore control of the rate of siloxane condensation is simpler. Alkoxy groups of less than 5 carbon atoms are especially advantageous (and are preferred) for the radical represented by Z in Formulas I and II, because the rate of hydrolysis can be inconveniently slow when the organic hydrolyzable radical(s) have a higher molecular weight (i.e., more carbon atoms).

Illustrative examples of radicals represented by A in Formula I include, for example, biphenylyl or xenyl, naphthyl, and the various phenyl-substituted naphthyls, e.g., 1-(4-phenylnaphthyl); also, acenaphthyl, anthracyl, benzonaphthyl and phenanthryl.

More specific examples of compounds embraced by Formula I are 5-acenaphthyltrimethoxysilane, 5-acenaphthyltriethoxysilane, 5-acenaphthyltripropoxy- through -trihexoxysilanes (both normal and isomeric forms), 5-acenaphthyltriphenoxysilane, bis(5-acenaphthyl)dimethoxysilane, bis(5-acenaphthyl)diethoxysilane, bis(5-acenaphthyl)dipropoxy- through -dihexoxysilanes (both normal and isomeric forms), bis(5-acenaphthyl)diphenoxysilane, 4-biphenylyltrimethoxysilane, 4-biphenylyltriethoxysilane, 4-biphenylyltripropoxy- through -trihexoxysilanes (both normal and isomeric forms), 4-biphenylyltriphenoxysilane, bis(4-biphenylyl)dimethoxysilane, bis(4-biphenylyl)diethoxysilane, bis(4-biphenylyl)dipropoxy- through -dihexoxysilanes (both normal and isomeric forms), bis(4-biphenylyl)diphenoxysilane, 9-penanthryltrimethoxysilane, 9-phenanthryltriethoxysilane, 9-phenanthryltripropoxy- through -trihexoxysilanes (both normal and isomeric forms), 9-phenanthryltriphenoxysilane, bis(9-phenanthryl)dimethoxysilane, bis(9-phenanthryl)diethoxysilane, bis(9-phenanthryl)dipropoxy- through -dihexoxysilanes (both normal and isomeric forms), bis-(9-phenanthryl)diphenoxysilane, 1-naphthyltrimethoxysilane, 1-naphthyltriethoxysilane, 1-naphthyltripropoxy- through -trihexoxysilanes (both normal and isomeric forms), 1-naphthyltriphenoxysilane, bis(1-naphthyl)dimethoxysilane, bis(1-naphthyl)diethoxysilane, bis(1-naphthyl)dipropoxy- through -dihexoxysilanes (both normal and isomeric forms), bis(1-naphthyl)diphenoxysilane, and others that will be apparent to those skilled in the art from Formula I and from the numerous illustrative examples of radicals represented by A and Z in said formula.

Illustrative examples of radicals represented by T in Formula II are alkyl, e.g., methyl, ethyl and propyl through hexyl (both normal and isomeric forms), cyclopentyl, cyclohexyl, vinyl and the normal and isomeric forms of propenyl through hexenyl, and phenyl.

More specific examples of compounds embraced by Formula II are given hereinafter with respect to compounds within the scope of Formula IV.

Monomeric starting materials of the formula

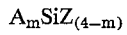

$$A_mSiZ_{(4-m)}$$

can be prepared by a variety of procedures known to the art. For example, a convenient route involves conversion of a halide, AX, to the corresponding lithium derivative, ALi, or Grignard reagent, AMgX, followed by condensation of the organometallic reagent with a silicon tetrahalide or an alkyl orthosilicate in a suitable molar ratio. Conversion of one hydrolyzable function on silicon to another can also be readily effected. Ethanolysis and acetolysis of silicon halides are examples of such conversions.

The means selected to effect hydrolysis of the starting materials and condensation of the resultant silanols is dependent primarily upon the physical characteristics desired in the product. When liquids or films are to be prepared, hydrolysis and condensation can be carried out simply by contacting the monomer or mixture of monomers with water. Usually, however, one or more conditions designed to increase speed or homogeneity of reaction, such as stirring, elevated temperatures, addition of acid, use of an added solvent, are used. Viscosity of the final product can be regulated by controlling the time of reaction, use of catalysts, concentration of reactants, rate of evaporation, and similar variables. The particular manner in which control of these variables will be attained will depend on the particular circumstances, and can be determined by routine experimentation according to procedures generally well known to those skilled in the art.

In carrying out one embodiment of the pesent invention there is provided a method of preparing a luminescent organopolysiloxane resin which comprises heating (A) at least one compound of the kind defined in Formula I alone or admixed with (B) at least one compound of the kind defined in Formula II, together with from 1.5 to 10 moles of water for each mole of the total molar amount of the silicon compound(s) represented by (A) alone or admixed with (B). Heating is continued for at least one hour and up to about 10 hours or more at a temperature of at least about 50° C. while retaining at least about 1.5 moles of hydroxy-containing by-products in the reaction mass per mole of silicon-containing starting material, assuming complete hydrolysis of all the hydroxyhydrocarbyl-silicon linkages in the said reaction mass. Thereafter the temperature of the reaction mass is gradually raised to a final temperature of from about 100° C. to about 300° C. while gradually removing by volatilization alkanol and/or phenolic by-products and some water. This occurs over a time interval of at least 5 minutes. Thereafter, condensation and heating are continued in the aforesaid temperature range of from 100°–300° C. for a period short of gel or solid formation within the said temperature range.

Suitable experimentally-determined variations of the time and temperature parameters of the process involved in making the luminescent organopolysiloxanes of this invention would probably allow use of, for example, alkoxysilanes containing a higher number of carbon atoms in an alkoxy chain. However, in general, the longer hydrolysis time required by alkoxy radicals of longer chain-length makes them, ordinarily, undesirable for use, since an important aspect of the process features of the present invention involving the production of the luminescent organopolysiloxane is the relatively high speed at which the process can be carried out.

As has been indicated hereinbefore, the concentration of water in the initial hydrolysis-condensation reaction mixture advantageously is at least about 1.5 moles, more particularly from about 1.5 moles to about 10 moles of water, per mole of the total amount of hydrolyzable silicon-containing reactant embraced by (A) alone or admixed with (B). Solid organopolysiloxane resins embraced by this invention can be prepared at the aforementioned lower concentration of water, but further decrease in the water content of the reaction mass ordinarily leads to the production of polymers that are rubbery and soft, presumably due to incomplete hydrolysis and condensation. If the quantity of water is in the range of from about 1.5 moles to about 5 moles of water per mole of the hydrolyzable silicon-containing monomeric material, the hydroxy-containing by-products, e.g., alkanols or phenol, formed during hydrolysis, act as a solvent for the other products and reactants, as a result of which the initially heterogeneous reaction mass becomes clear and homogeneous. This homogeneity is desirable, since it prevents resin precipitation and allows more uniform control of resin formation.

If the ratio of water to hydrolyzable silicon-containing monomeric material substantially exceeds 5:1, the resulting amount of by-product hydrolysis products, such as alkanols or phenol, is insufficient to convert the aqueous medium to a solvent for the reactants and the reaction products, and resin precipitation can occur. Insolubility of resinous products at higher water concentrations can be overcome by adding a water-miscible organic solvent, e.g., ethanol, isopropanol, or any other organic solvent for the polymer having water-miscibility characteristics. However, at water-concentrations above about 10 moles of water per mole of hydrolyzable silicon-containing monomer, gel formation may occur even if sufficient organic solvent is added to make the reaction mass homogeneous. The exact upper limit of the ratio of water to hydrolyzable silicon-containing monomeric material is dependent upon such influencing factors as, for example, the particular hydrolyzable silicon-containing material employed, the pH and temperature of the reaction mass, time of reaction, etc. Hence the upper limit cannot be set forth precisely, but can be determined by routine test in each case. The limits within which no addition of organic solvent is required, viz., from about 1.5 moles to about 5.0 moles of water per mole of hydrolyzable silicon-containing monomer, are preferred.

At pressures near one atmosphere, temperatures in the range of from about 50° C. to the reflux temperature of the reaction mass are useful. Temperatures much below this range require substantially longer times for reaction, and thus obviate a particularly advantageous aspect of the resin-making process of this invention, namely, its relatively high speed of operation. Also, no particular improvement in properties is attained by the use of such lower temperatures. In general, temperatures at or near the reflux temperature of the reaction mass are preferred, especially when refluxing occurs at from about 70° C. to about 90° C. Under the concentration and temperature conditions hereinbefore described, the initial hydrolysis and condensation are complete in from about 1 to about 10 hours, depending upon the particular materials and conditions used, and generally within from about 2 to 3 hours.

It is preferred that some of the hydrolysis by-products, such as alkanols or phenol, be retained in the reaction mass during the initial hydrolysis and condensation. It is believed that the presence of such hydroxy-containing by-products slows, by mass action, the overall rate of hydrolysis-condensation. This control of the rate of resin formation prevents gel formation and makes possible the preparation of homogeneous, luminescent, highly cross-linked polymers having good dimensional stability. If the concentration of hydrolysis by-products is allowed to fall substantially below 1.5 moles thereof per mole of the hydrolyzable silicon-containing monomeric material (assuming that complete hydrolysis takes place), gel formation occurs. This limit can vary slightly with the particular materials and conditions employed.

After initial hydrolysis and condensation under the conditions just described, controlled volatilization of the hydrolysis by-products, e.g., alkanols and phenol, and water, is effected while the reaction mass is heated to from about 100° C. to about 300° C. This relatively high (i.e., above 100° C.) temperature step is herein designated as the "pre-cure" step.

The purpose of pre-cure is to effect controlled removal of volatiles while the siloxane condensation reaction continues at a convenient rate, but which is nevertheless slowly enough to avoid gel formation. In general, the highest possible pre-cure temperature is preferred, since this provides greatest impetus to siloxane formation and volatilization of the hydrolysis by-products, and makes possible the shortest time required to effect final cure at a lower temperature.

The temperature to which a particular reaction mass can be heated during pre-cure without causing gelation thereof depends, for example, upon the particular materials used and their prior treatment, but the limit can be readily established by heating an aliquot to gelation and keeping the pre-cure temperature of the main batch slightly below this gelation point. The pre-cure time is similarly dependent upon several variables. At a pre-cure temperature above 100° C. it is, in general, at least about 5 minutes, although the time at the highest temperatures attained can be merely momentary.

To avoid gelation and to effect polysiloxane formation at a conveniently rapid rate, the acidity of the initial hydrolysis-condensation reaction mass advantageously is maintained within certain limits hereinafter set forth in detail. Commercial hydrolyzable silicon-containing compounds (silanes) of the kind embraced by Formula II, such as commercial alkoxysilanes, usually contain a quantity of acid or base that exceeds the relatively narrow limits permissible in the initial reaction mixture employed in practicing a preferred embodiment of the instant invention. Impure monomers can be used in the hydrolysis reaction mixture, followed by addition of acid or base to adjust the pH to the required level. However, the large amount of salts that are formed impair desirable properties, especially transparency, of the final products. Salts, particularly those of variable-valence cations, may also act as catalysts for siloxane formation. It is, therefore, preferable to adjust the pH of the monomer or mixture of monomers before preparing the reaction mixture. Simple distillation is unsuitable because it increases the acidity of the monomeric material, probably by oxidation of some organic groups to acidic or potentially acidic functions such as carboxylic acids, esters, aldehydes and/or ketones. Use of a nitrogen atmosphere is insufficient to prevent this acidity increase, apparently because the system itself contains oxidizing species. Reduction of acid content can be carried out by adding bases such as metal hydroxides or amines, but the salts that are formed are objectionable impurities in the final products.

A preferred technique for preparing the monomeric material is by distillation of an admixture of the monomer with a reagent that will convert acidic species therein to non-volatile compounds, for instance as disclosed in the copending application of Burzynski and Martin, Ser. No. 370,684, which is assigned to the same assignee as the present invention.

Initial hydrolysis-condensation is conveniently carried out by charging to a reaction vessel pure water and a hydrolyzable silane of the kind embraced by Formula I alone; or, as desired or as conditions may require, an admixture of at least one hydrolyzable silane within the scope of Formula I and at least one hydrolyzable silane of the kind embraced by Formula II in the ratio of, for example, from 0.0001 to 99.9999 (more particularly from 0.001 to 99.999) mole percent of the former to from 99.9999 to 0.0001 (more particularly from 99.999 to 0.001) mole percent of the latter. The charge to the reaction vessel is then heated under reflux.

The initially cloudy reaction mixture clears on heating, usually within an hour, because the hydroxyhydrocarbon by-product, specifically alcohol, dissolves the other components of the mixture. A suitable degree of hydrolysis-condensation is usually obtained if reflux is allowed to proceed for from about 1 to 4 hours after the mixture clears. This step can be carried out a lower temperatures, but the rate is substantially slower.

The upper limit of permissible acid content during this initial hydrolysis-condensation, in practicing a preferred embodiment of this invention, is that beyond which gel formation occurs. The lower limit is determined by the desired reaction time. In general, the minimum reaction time to obtain satisfactory products is usually about 1 hour under reflux. Maximum and minimum allowable acid contents vary with the ratio of hydrolyzable silane(s) and water used. The lower theoretical water content is $Z/2$, where Z is the average number of hydrolyzable groups attached to silicon throughout the reaction mass. Thus when the hydrolyzable silane is, for example, a (polynuclear aryl)trialkoxysilane as the sole silane constituent, the theoretical lower molar ratio of hydrolyzable silane: water is 1:1.5. At this molar ratio, the acid content is generally controlled within the range of from about 50 to about 650 parts (or higher in some cases) of HCl per million parts of hydrolyzable silane. When the hydrolyzable silane:water molar ratio is 1:3.0, the minimum acid content is about zero part of HCl per million parts of the hydrolyzable silane and the maximum is about 5 parts on this same basis.

The aforementioned limits are necessarily subject to minor variation in each case. First, polymer formation by its nature will not proceed identically in any two runs, and the particular mode of polymerization can alter slightly the acid sensitivity of the system. Second, use of other hydrolyzable silanes in certain amounts as comonomers can reduce acid sensitivity, but the effect will generally be small. Third, extremely small quantities of impurities in a given sample, impractical to remove, can alter acid sensivity slightly. These factors, however, affect only the maximal and minimal extremes of acid content, and the major portion of the suitable area indicated will be unchanged.

It is usually most convenient to reduce the acid content of the monomers to about zero weight part per million HCl (i.e., zero part by weight of HCl per million parts of monomer) by suitable acid-removal technique and, if necessary, then adjust the acidity of the initial reaction mixture by adding acid to the water used. Although generally any acidic material soluble in the reaction mass can be used, organic acids such as phenol and formic acid are particularly suitable because they retard subsequent oxidation of the reactants.

The reaction mass obtained from the initial hydrolysis-condensation reaction is concentrated by removing volatile components, conveniently by distillation from the vessel containing the said mass. All of the solvents should not be removed or the resin will have a pronounced tendency to gel. Usually, removal of about 80 mole percent of the hydroxyhydrocarbon by-product, e.g., an alkanol, gives a residue convenient to manipulate further by the particular means herein described. The concentrate thus obtained is next heated to a temperature above the boiling point of pure water at the prevailing pressure for a specified time, conveniently while stirring in an open vessel. The time and temperature of this pre-cure step are determined by the particular composition used, but in general a temperature of 110° to 300° C. at ambient pressure and a period up to about 30 minutes are typical. The elimination of water and other volatile materials from the reaction mass at this point presumably leads to further linear polymerization and cross-linking, and the mass becomes increasingly viscous.

If the pre-cure step is omitted from the process, the resins cast from the liquid organopolysiloxane crack severely during the final curing step. Such cracked resins can be pulverized, e.g., to 300-mesh particle size and finer, and the finely divided luminescent resin used as a filler in paints and molding compositions (e.g., urea- and melamine-formaldehyde resins, methyl methacrylate and other acrylate polymers, polystyrene, etc.), and in making other filled compositions and articles from any of the available unfilled or partly filled natural resins, thermoplastic and thermosetting resins and plastics, and the like.

PRODUCTION OF SOLID, LUMINESCENT, MACHINABLE, THERMOSET RESINS OR STRUCTURES

As has been indicated hereinbefore, the present invention can be practiced by modifying the solid, machinable, thermoset organopolysiloxane resins or structures disclosed and claimed in the aforementioned Burzynski and Martin copending application Ser. No. 306,344. The disclosure of this application and of the aforementioned Burzynski and Martin copending application Ser. No. 370,684 now abandoned, are by this cross-reference made a part of the disclosure of the instant invention, both of which are assigned to the same assignee as the present invention.

The invention of Burzynski et al. application Ser. No. 370,684 is directed to a method of preparing a solid resin by (a) heating reactant(s) consisting of a methyltrialkoxysilane of the formula III 

and 0 to 5 mole percent, based on total silane reactant(s), of at least one compound of the formula IV 

wherein each T independently represents a monovalent radical selected from the group consisting of aryl, alkyl (including cycloalkyl), and alkenyl radicals, each of which contains less than 7 carbon atoms, and the alkoxy radical, RO—, wherein R represents an alkyl radical of less than 4 carbon atoms, and from 1.5 to 10 moles of water per mole of silane, for at least one hour and up to 10 hours at temperatures of at least 50° C. while retaining at least 1.5 mole of alkanol by-products in said mixture per mole of silane starting material assuming complete hydrolysis of all alkoxy-silicon linkages in said mixture, and (b) gradually raising the temperature of the resulting mixture to a final temperature of from 100° to 300° C. while gradually removing by volatilization alkanol by-products and some water, over a time interval of at least 5 minutes, and continuing condensation and heating in the range of 100° to 300° C. for a time short of solid or gel formation in said temperature range.

Methyltrialkoxysilanes used in practicing the invention of the aforementioned Ser. No. 370,684 are those of the formula $CH_3Si(OR)_3$ where each R represents an alkyl radical with less than 4 (i.e., 1 to 3) carbon atoms. Included are methyltrimethoxysilane, methyltriethoxysilane, methyltri-n-propoxysilane, and methyltriisopropoxysilane, as well as compounds with mixed alkoxy groups. Examples of co-reactants embraced by Formula IV (and also by Formula II, supra) include trimethylmethoxysilane, tri(1-methylethyl)ethoxysilane, di(1-methylpropyl)diethoxysilane, divinyldiproyoxysilane, diphenyldiethoxysilane, propylpentylmethoxyethoxysilane, methylallyldi-(1-methylethoxy)silane, vinylphenyldimethoxysilane, ethyltriethoxysilane, (1-methylethyl)trimethoxysilane, (1,1-dimethylethyl)tripopoxysilane, hexyltriethoxysilane, and vinyltriethoxysilane.

This embodiment of the present invention differs from that of the invention of Ser. No. 370,684 in that part of the alkoxysilane of Formula III and all or part of the alkoxysilane of Formula IV, if present, is replaced by a compound of the kind embraced by Formula I and which contains a monovalent polynuclear aromatic (preferably aromatic hydrocarbon) substituent. Also, in this embodiment of the invention Z in Formula I preferably represents an alkyl radical with not more than 4 carbon atoms in the alkoxy substituent. The amount of the silane reactant of Formula I may constitute, for example, from 0.0001 (more particularly from 0.01 to 0.5 or 1) mole percent to 5, 10, 15 or more mole percent of the total molar amount of the silane reactants of Formulas I, III and IV, but preferably does not constitute more than about 5 mole percent of the total amount of the aforesaid silane reactants.

It will be understood, of course, that lower or higher molar percentages of the Formula I reactant than those mentioned above may be used, if desired, so long as a sufficient amount is present to impart the desired degree of fluorescence to the final product.

The comonomers embraced by Formula I and also by Formula IV, if employed, can be used to modify the properties of the resins according to principles known generally to the art. Thus, comonomers containing 3 or 4 alkoxy groups act as cross-linking agents; those with 2 alkoxy groups act to increase chain length and decrease cross-linking; and those with one alkoxy group act as chain-terminating agents. In particular, inclusion of dialkoxysilanes such as dimethyldiethoxysilane can be used to diminish cross-linking and thus provide less brittle products. Inclusion of more than about 5 mole percent of alkyl orthosilicates can lead to excessive cross-linking and attendant brittleness, and quantities of other comonomers substantially above this amount may cause decreased chemical resistance.

In this embodiment, too, the concentration of water in the initial hydrolysis-condensation reaction mixture should be in the range of from about 1.5 moles to about 10 moles of water per mole of silane reactants. Likewise, the other remarks made hereinbefore with respect to resin precipitation and avoidance thereof apply to the production of a solid, machinable polysiloxane, as do also the remarks made with regard to the temperature and pressure of the reaction, and the retention of hydrolysis products (e.g., an alkanol) in the reaction mass during hydrolysis and initial condensation.

Inital hydrolysis-condensation is conveniently carried out by placing in a flask pure water, methyltrialkoxysilane, the acid content of which has been suitably adjusted, and up to, for example, 5 mole percent, based on the total hydrolyzable silanes, of a compound of the kind embraced by Formula I with or without a compound of the kind embraced by Formula IV. If desired or deemed necessary, these compounds may be purified. The resulting mixture is then heated under reflux conditions.

The initially cloudy reaction mixture clears on heating, usually within an hour, because the hydroxyhydrocarbon by-product, specifically alcohol, dissolves the other components of the mixture. As previously has been stated, a suitable degree of hydrolysis-condensation is usually obtained if reflux is allowed to proceed for from about 1 to 4 hours after the mixture clears.

Other conditions with respect to the permissible acid content during the initial hydrolysis-concentration step, and concerning other influencing variables have been given hereinbefore.

As previously indicated, some alkanol or other hydrolysis by-product should be retained in the reaction mass during hydrolysis and initial condensation for the reasons previously given.

To avoid gelation and effect polysiloxane formation at a conveniently rapid rate, the acidity of the initial hydrolysis-condensation reaction mixture advantageously is suitably controlled.

After initial hydrolysis and condensation controlled volatilization of hydrolysis by-products and water is effected, while the temperature of the mixture is raised to temperatures in the range of 100° to 300° C., thereby to pre-cure the resin in the manner and for the reasons previously stated.

The use of inert additives and the technique of final curing are the same as that given in the following description of another modification of the invention.

ANOTHER EMBODIMENT OF THE INVENTION

In accordance with another embodiment of the present invention the compositions and methods described in the aforementioned Burzynski and Martin copending application Ser. No. 306,344 are modified so as to obtain luminescent, specifically fluorescent, machinable heat-resistant organopolysiloxanes. In this Burzynski et al. application (hereafter often designated as the —344 application), a mixture which comprises a precursor hydrolyzable to methylsilanetriol, a precursor hydrolyzable to phenylsilane methylsilanetriol, a precursor hydrolyzable to phenylsilanetriol, and water is heated; the reaction mixture is concentrated by removing a substantial portion but not all of the volatile components; heated above the boiling point of pure water at the prevailing pressure; and formed and heated at a temperature below the boiling point of pure water at the prevailing pressure to provide a machinable, thermoset, heat-resistant organopolysiloxane body.

In the procedure of the invention of the —344 application usually a mixture which comprises a hydrolyzable methyltrialkoxysilane, a hydrolyzable phenyltrialkoxysilane, and water in a relative molar ratio of $x:y$: at least $1.5(x+y)$, respectively, wherein $x$ and $y$ are independently selected from the range of 1 to 10, inclusive, is heated at a temperature between ambient temperature and reflux temperature for a time of 1 to 10 hours; 50 to 90 mole percent of the alkanol by-product is removed by volatilization; the reaction mixture is heated to effect pre-cure at a temperature within the range of up to 100 centigrade degrees above the boiling point of pure water at the prevailing pressure for a time up to 30 minutes; and the resinous mixture thus obtained is formed, usually by casting, and then cured for a time of at least 1 hour and up to 30 days at a temperature of from 1 centigrade degree to 60 centigrade degrees below the boiling point of pure water at the prevailing pressure to give a machinable, thermoset, heat-resistant organopolysiloxane body.

The methyltrialkoxysilanes and phenyltrialkoxysilanes cited in the preceding paragraph refer to compounds of the formula $CH_3Si(OR)_3$ and $C_6H_5Si(OR)_3$, wherein R represents a monovalent alkyl radical of less than five (i.e., 1–4) carbon atoms. Examples of such methyltrialkoxysilanes are methyltrimethoxysilane, methyltriethoxysilane, methyltri(1-propoxy)silane, methyltri(2-propoxy)silane, methyltri(2-methyl-2-propoxy)silane, methyltri(1-butoxy)silane, and methyltri(2-butoxy)silane; examples of phenyltrialkoxysilanes are phenyltrimethoxysilane, phenyltriethoxysilane, phenyltri(1-propoxy)silane, phenyltri(2-propoxy)silane, phenyltri(2 - methyl - 2 - propoxy)silane, phenyltri(1-butoxy)silane, and phenyltri(2-butoxy)silane.

A further aspect of the invention of the —344 application that provides an especially heat-resistant, machinable, thermosetting organopolysiloxane body comprises heating a mixture which comprises a hydrolyzable methyltrialkoxysilane, a hydrolyzable phenyltrialkoxysilane, and water in a relative molar ratio of $x:y$: at least $1.5(x+y)$, respectively, and advantageously a ratio of $x:y:3(x+y)$, respectively, wherein $x$ and $y$ are independently selected from the range of 1 to 10, inclusive, at a temperature between ambient temperature and 150° C. for a time of 1 to 10 hours; removing 50 to 90 mole percent of the alkanol by-product by volatilization; heating the reaction mixture to effect pre-cure at a temperature within the range of from 5 centigrade degrees up to 110 centigrade degrees above the boiling point of pure water at the prevailing pressure, but usually not above 250° C., for a time up to 30 minutes; casting and then curing the resinous mixture thus obtained for at least one day at a temperature within 10 centigrade degrees below the boiling point of pure water at the prevailing pressure, then at a temperature increasing continually up to a maximum of up to 350° C. over a period of from 2 to 30 days, and finally allowing the sample to return slowly to ambient temperature over a time of from 1 to 12 hours.

A preferred procedure of the invention of the —344 application comprises heating at reflux temperatures, for from 2 to 4 hours, a reaction mixture which comprises methyltriethoxysilane, phenyltriethoxysilane, and water in a relative molar ratio of $x:y$: at least 1.5 $(x+y)$, respectively, and advantageously a ratio of $x:y:3(x+y)$, respectively; in other words, on a molar basis the ratio of water to the sum of $x+y$ is a minimum of 1.5 and advantageously is 3. The values $x$ and $y$ are independently selected from the range of 1 to 5, inclusive. Additional steps in the preferred procedure include distilling 70 to 80 mole of 95% ethanol by-product from the reaction mixture, subjecting the distillation residue to a pre-cure at 110° to 200° C. for a time up to 10 minutes at ambient pressure; and finally casting and then curing the resulting resinous mixture at 25° to 95° C. and at about atmospheric pressure for a time of from one day to one week to give a machinable, thermoset, heat-resistant organopolysilaxane body.

The initial reaction mixture of the procedure of the —344 application optionally contains an acidic or catalyst, although the hydrolysis and subsequent condensation normally proceed at a convenient rate without them. To avoid premature gelation of the resins the quantity of acid in the reaction mixture must be below 0.01 mole of acid per mole of hydrolyzable precursor of a silanol. Similarly a solvent, e.g., ethanol can be added to render the reaction mixture homogeneous.

The initial reaction mixture used in the invention of the —344 application also may contain precursors of methylsilanetriol and phenylsilanetriol in the above-defined ratios and 0 to 10 mole percent, usually 0 to 5 mole percent, of a co-reactant which, when present, usually comprises at least 1 mole percent of the mixture. (The aforementioned mole percentages are based on the hydrolyzable silane components of the initial mixture.) The aforesaid coreactant comprises at least one compound of the formula

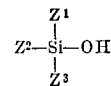

wherein $Z^1$, $Z^2$ and $Z^3$ represent monovalent radicals independently selected from the group consisting of hydrocarbon aryl, alkyl (including cycloalkyl) and alkenyl radicals, each of which contains less than 7 (i.e., 1–6) carbon atoms, and the hydroxyl radical. Examples of such co-reactants are trimethylsilanol, tri(1 - methylethyl)-silanol, trihexylsilanol, di(1-methylpropyl)silanediol, divinylsilanediol, diphenylsilanediol, propylpentylsilanediol, methylallylsilanediol, vinylphenylsilanediol, ethylsilanetriol, 1 - methylethylsilanetriol, 1,1 - dimethylethylsilanetriol, 2,2-dimethylpropylsilanetriol, hexylsilanetriol, and vinylsilanetriol. These co-reactants can be added to the reaction mixture in the form of their precursors of the formula VI

wherein $T^1$, $T^2$ and $T^3$ represent monovalant radicals independently selected from the group consisting of hydrocarbon aryl, alkyl (including cycloalkyl) and alkenyl radicals, each of which contains less than 7 carbon atoms, and the alkoxy radical RO—, wherein R has the meaning previously defined. Example of such precursors are trimethylmethoxysilane, tri(1 - methylethyl)ethoxysilane, trihexyl (1,1 - dimethylethoxy)silane, tricycyopentylmethoxysilane, di(1 - methylpropyl)diethoxysilane, divinyldipropoxysilane, diphenyldiethoxysilane, propylpentylmethoxyethoxysilane, methylallyldi(1-methylethoxy)silane, vinylphenyldimethoxysilane, ethyltriethoxysilane, (1-methylethyl)trimethoxysilane, (1,1 - dimethylethyl)tripropoxysilane, (2,2 - dimethylpropyl)tributoxysilane, hexyltriethoxysilane, and vinyltriethoxysilane.

A further variation in the procedure of the invention of the —344 application can be achieved by hydrolyzing individually a hydrolyzable methyltrialkoxysilane and a hydrolyzable phenyltrialkoxysilane, and then combining the resulting organopolysiloxanes to form the initial reaction mixture described above. The resulting resinous mixture ultimately yields, by the method described, a machinable, thermoset, heat-resistant organopolysiloxane body.

Products of the invention of the —344 application and luminescent, specifically fluorescent, modifications of which can be produced by the instant invention are machinable, heat-resistant bodies comprising or consisting essentially of the siloxane condensation product of methylsilanetriol and phenysilanetriol, in a molar ratio of from 1:10 to 10:1 (preferably from 1:5 to 5:1), respectively, and into which also may be incorporated, e.g., by co-condensation of the later-named diol with the methylsilanetriol and phenylsilanetriol, from 0 to 10 (preferably from 0 to 5) mole percent of the siloxane condensation product of diphenylsilanediol.

This embodiment of the present invention differs from that of the invention of Ser. No. 306,344 in that part of the methylsilanetriol and/or part of the phenylsilanetriol or their precursors such as hydrolyzable methyltrialkoxysilanes or hydrolyzable phenyltrialkoxysilanes, respectively, are replaced by a compound of the kind embraced by Formula I and which contains a monovalent polynuclear aromatic (preferably aromatic hydrocarbon) substituent. The amount of the silane reactant of Formula I, in this embodiment also, may constitute from, for example, 0.0001 (more particularly 0.001-1.0) mole percent to 5 or 10 or more mole percent of the total molar amount of the other silicon-containing reactants, but preferably does not constitute more than about 5 mole percent of the total amount of the aforesaid reactants.

Additives that are substantially chemically inert under the reaction conditions can be added to obtain desired variations in properties. Fillers such as silica, unreactive organosilanes, and clays are suitable. Coloring agents such as alcohol- or water-soluble dyes or insoluble pigments can be added to the condensation products of the present invention to give luminescent organopolysiloxane bodies of the type described and which are also colored. The quantity of dye or pigment and the most advantageous point of its addition will depend upon the particular coloring agent used, and the desired color of the product. These variables are, therefore, best determined by routine test.

After casting in molds, the organopolysiloxane resins are cured. Cross-linking and some linear polymerization probably proceed at this step, since the resin becomes increasingly hard. This final cure can be carried out at room temperature (20°–30° C.) or lower, simply by allowing the cast resin to stand undisturbed; commercially, this may be attractive since no heat-treatment cost is involved. Thus, the manipulative steps of the process of this invention, that is, those steps before the final cure in which the resin must be heated, transferred, etc., usually require less than 5 hours and often can be completed in from 1 to 2 hours.

Although the final cure may be carried out without added heat, a more convenient procedure involves heating the pre-cured, cast resin at about 90° C. for about 3 days, or sometimes longer, for instance up to 7 days. An especially strong product can be obtained if the pre-cured resin, cast in an aluminum foil-lined mold, is heated at about 90° C. until firm, allowed to cool to room temperature, cooled if desired to about 0° C., removed from the mold, and replaced, inverted, in the 90° C. oven until hard. This preferred heat treatment evidently reduces stresses in the final products. The final stages of cure can also be effected at temperatures above 100° C. after the 90° C. cure has brought the resin to a substantially hard condition.

The luminescent, specifically fluorescent, resinous product of the pre-cure step is soluble in water-miscible organic solvents such as alkanols (e.g., methanol through pentanol), ketones (e.g., acetone, methyl ethyl ketone, etc.), ethers (e.g., glycol monoethyl ether, dioxane, tetrahydrofuran, etc.), as well as many other common organic solvents. The resulting solutions, which can be used as liquid targets in a luminescent device, have prolonged storage life before gelation occurs, and their stability increases with decreasing temperature and resin concentration. Storage life is prohibitively short if the solution contains more than about 90 weight percent resin.

A lower limit for resin concentration is set only by convenience, since storage and subsequent removal of solvent from extremely dilute solutions is generally commercially unfavorable. These dilute solutions usually containing about 50 weight percent of resin solids, can be evaporated to a more viscous stage and used as molding materials by the further curing steps already described. They can also be used as fluorescent film-forming materials, e.g., in coating applications, by spraying, brushing, or other means known to the art. The thickness of the resulting films can be controlled, of course, by varying the concentration of the resin solution and the number of layers applied. The coatings thereby obtained can be cured by heating, e.g., according to the curing process previously described for making a molded resin. These films are useful as water- and abrasion-resistant coatings, and as electrical insulation.

It will be understood that the processes of this invention to prepare solid luminescent organopolysiloxane bodies are, in general, also applicable to the formation of such films. The final, cured products are substantially solid and apparently possess a high degree of cross-linking, since they are substantially insoluble in solvents such as benzene and toluene.

In order that those skilled in the art may better understand how the present invention can be carried into effect, the following examples are given by way of illustration and not by way of limitation. All parts and percentages are by weight unless otherwise stated.

EXAMPLE 1.—A. PREPARATION OF ALPHA-NAPHTHYL TRIETHOXYSILANE AND BIS(ALPHA-NAPHTHYL)-DIETHOXYSILANE

|  | Wt. Used, g. | Moles Used | Molar Ratio | Solvent |
|---|---|---|---|---|
| Lithium | 47.3 | 6.8 | 2 | 500 ml. ether. |
| α-Bromonaphthalene | 700 | 3.39 | 1 | 1,200 ml. ether. |
| Ethyl orthosilicate | 705 | 3.39 | 1 | 1,500 ml. toluene. |

A 3-liter reaction flask provided with a stirring assembly, addition funnel and condenser is used. Additional equipment includes a distillation head for the flask, a suction receiver and a filter.

Alpha-naphthyllithium is first prepared in an inert atmosphere (e.g., nitrogen) by the addition of alpha-bromonaphthalene (alpha-naphthyl bromide) in ether to metallic lithium in ether at about −10° to about +36° C. with stirring. The mixture is stirred until all the lithium has dissolved (at +36° C.).

The ether solution of naphthyllithium is then added dropwise to the toluene solution of ethyl orthosilicate, Si(OEt)$_4$, where "Et" equals $C_2H_5$. There is a slight indication of reaction as evidenced by an increase in the reflux rate of the added ether. (Instead of toluene other organic solvents may be used, e.g., benzene, xylene, etc.).

The reaction mass is heated under reflux for 72 hours. The ether is stripped from the solution to a pot temperature of 85° C. The reaction mass is held at this temperature for 24 hours, after which it is filtered. At this point the reaction mass is a reddish orange-brown in color with light fluorescent properties.

The solvent (toluene) is then stripped from the solution. The residue is vacuum-distilled. The total distillate weighs over 500 g. with most of it having a B.P. of 124° C./0.2 mm. and a lesser amount with a B.P. of 196° C./0.2 mm. This distillate is then redistilled, yielding the following cuts:

I. B.P., 110° C./0.06 mm.; yield, 305 g.
II. B.P., 187° C./0.06 mm.; yield, 115 g.

Infrared examination and chemical analysis shows that Cut I is alpha-naphthyltriethoxysilane and that Cut II is bis(alpha-naphthyl)diethoxysilane.

B. PREPARATION OF FLUORESCENT ORGANO-POLYSILOXANE RESIN

A fluorescent, glass (synthetic glass) resin is produced by co-hydrolysis and co-condensation of alpha-naphthyltriethoxysilane (NTES) and methyltriethoxysilane (MTES) as follows:

| Reactants | Wt. Used, g. | Moles Used | Approx. Molar Ratio |
|---|---|---|---|
| NTES | 7.25 | ¼ | 1 |
| MTES | 89 | ½ | 2 |
| Water | 41 | 2¼ | 9 |

The above reactants are heated together with stirring to 85° C. After heating with stirring under reflux for 3 hours the reaction mixture does not clear. After adding one drop of 1 N HCl, the mixture changes to a clear solution in 6 minutes. The solution is then refluxed for an additional 2 hours. At the end of this period, 8 drops of 0.1 N NaOH are added to the solution, after which about 80% (85 ml.) of the by-product ethanol is distilled off.

The residue is pre-cured by heating to 140° C. over a period of 20 minutes. The resulting viscous organosiloxane polymer is cast into discs using an aluminum foil-lined mold two inches in diameter and about ¾-inch deep, and which is filled to a depth of about ½ inch. The molded samples are cured at 90° C. for 5 days, cooled to about 0° C. and removed from the mold; thereafter, they are additionally cured at 90° C. for 3 days to give hard, transparent discs. These discs are quite fluorescent in U.V. light, emitting a bright-blue light.

C. PREPARATION OF FLUORESCENT ORGANO-POLYSILOXANE RESIN

Another technique for preparing a fluorescent siloxane resin utilizing naphthyltriethoxysilane is as follows:

Methyltriethoxysilane (572 ml. redistilled over NaOH) and 164 ml. of water are heated together to 80° C. The mixture clears in 45 minutes. To the clear solution is added 170 g. of alpha-naphthyltriethoxysilane, and the resulting mixture is heated under reflux for 3½ hours. Eight (8) drops of hexamethyldisilane are then added and refluxing is continued for an additional ½ hour. After distilling off about 80% of the by-product ethanol, the residue is pre-cured as described in the B section of this example, and then cast into molds and cured (likewise as described under B) to yield hard, fluorescent polysiloxane resins.

EXAMPLE 2.—A. PREPARATION OF 9-PHENANTHRYLTRIETHOXYSILANE AND BIS(9-PHENANTHRYL)DIETHOXYSILANE

| | Wt. Used, g. | Moles Used | Approx. Molar Ratio | Solvent |
|---|---|---|---|---|
| Lithium | 5.55 | 0.80 | 2 | 100 ml. ether. |
| n-Butyl bromide | 55.0 | 0.40 | 1 | 500 ml. ether. |
| 9-bromophenanthrene | 100.0 | 0.39 | 1 | 1,000 ml. ether. |
| Ethyl orthosilicate | 189.0 | 0.60 | 1.5 | |

The same apparatus is used as in Example 1.

n-Butyllithium is prepared in an inert atmosphere by adding n-butyl bromide in ether to cut Li in ether at −7° to −10° C. with rapid stirring. It is stirred until all the Li has dissolved (at −10° C.). To this solution 9-bromo-phenanthrene in ether is added dropwise. The reaction temperature is allowed to warm to +10° C. and is stirred for 1½ hours. To this solution is rapidly added ethyl orthosilicate, and the reaction mass is refluxed at 36° C. for 24 hours. The ether is then stripped from the solution, and 800 ml. of toluene is added to aid subsequent filtration. The reaction mass is next refluxed for 20 hours, filtered and distilled.

The following cuts are obtained:

I. A light yellow liquid, B.P. 185°–195° C./1 mm.; yield about 80 g.
II. A viscous yellow liquid, B.P. 250°–295° C./1 mm.; yield about 25 g.

Each cut is then redistilled, yielding products having the following boiling points:

I. B.P. 173° C./0.5 mm.
II. B.P. 288°–293° C./0.5 mm.

Infrared examination and analyses for C, H and Si indicate that Cut I is 9-phenanthryltriethoxysilane (9-PATES) while Cut II is bis(9-phenanthryl)diethoxysilane (9-PADES). Analytical data are given below:

Cut I, percent.—Found: C, 68.8; H, 7.07; Si, 7.6. Theoretical for $C_{20}H_{24}O_3Si$: C, 70.2; H, 7.02; Si, 8.14.

Cut II, percent.—Found: C, 81.2; H, 6.44; Si, 5.6. Theoretical for $C_{32}H_{28}O_2Si$: C, 81.2; H, 5.99; Si, 5.96.

B. PREPARATION OF FLUORESCENT ORGANO-POLYSILOXANE RESIN

A fluorescent glass resin is produced by co-hydrolysis and co-condensation of 9-phenanthryltriethoxysilane and methyltriethoxysilane as follows:

| Reactants | Amount Used | Moles Used | Approx. Molar Ratio |
|---|---|---|---|
| MTES | 143 ml. | 0.75 | 1 |
| 9-PATES | 5.1 g. | 0.015 | 0.02 |
| Water | 28.0 g. | 1.50 | 2 |

One drop of 1 N HCl is added to a mixture of the above reactants, and the mixture is heated with stirring to 80° C. and held at that temperature for 4 hours. After heating for about ½ hour under reflux, the reaction mass begins to clear and the initial two-phase system becomes one. At the end of the reaction period, 100 ml. of ethanol is stripped off and the residual polysiloxane resin is pre-cured by heating to 140° C. in an open reaction vessel on a hot plate.

Test discs are prepared by pouring portions of the pre-cured resin into small aluminum pans which are then placed in a 90° C. oven for 48 hours. At the end of that time the resin has solidified into hard, machinable discs which are fluorescent in U.V. light.

C. PREPARATION OF FLUORESCENT ORGANO-POLYSILOXANE RESIN

This section illustrates the preparation of a fluorescent glass resin by co-hydrolysis and co-condensation of bis(9-phenanthryl)diethoxysilane and methyltriethoxysilane.

The proportions of reactants and procedure are exactly the same as in the B portion of this example with the exception that 0.5 g. (0.001 mole) of bis(9-phenanthryl) diethoxysilane is used instead of 5.1 g. (0.015 mole) of 9-phenanthryltriethoxysilane.

Surprisingly and unobviously this small amount of the phenanthryldiethoxysilane gives a hard polysiloxane resinous disc which is fluorescent under U.V. light.

EXAMPLE 3.—A. PREPARATION OF 5-ACENAPHTHYL-TRIETHOXYSILANE AND BIS(5-ACENAPHTHYL) DIETHOXYSILANE

|  | Wt. Used, g. | Moles Used | Approx. Molar Ratio | Solvent |
| --- | --- | --- | --- | --- |
| Lithium | 6 | 0.86 | 2 | 100 ml. ether. |
| n-Butyl bromide | 59 | 0.43 | 1 | 500 ml. ether. |
| 5-bromoacenaphthene | 100 | 0.43 | 1 | 1,000 ml. ether. |
| Ethyl orthosilicate | 175 | 0.77 | 1.44 |  |

The same apparatus is used as in Example 1.

n-Butyllithium is prepared in an inert atmosphere of $N_2$ by the addition of n-butyl bromide in ether to cut lithium in ether stirred rapidly at $-7°$ to $-10°$ C. The addition is made fast enough to keep a $-7°$ C. reaction temperature with exterior cooling by a Dry Ice-acetone bath. The mixture is stirred for an additional hour upon completion of the addition. To the mixture at $-10°$ C. is added, with stirring, the 5-bromoacenaphthene in ether. The reaction mixture is allowed to warm to $+10°$ C. and stirred at that temperature for 1 hour. To this mixture the ethyl orthosilicate is then added rapidly with stirring. The initially cloudy, yellow reaction mixture becomes clear and turns brownish in color.

The reaction mass is stirred for 12 hours, and then the ether is stripped from the solution. One liter of xylene is added, and the mixture is filtered hot. The isolated salts are washed with 500 ml. of boiling xylene and the combined filtrate and washings are distilled.

The following cuts are obtained:

I. A light yellow oil, B.P. 170–185° C./0.5 mm.; yield about 75 g.

II. A thick yellow oil, B.P. 285°–300° C./0.5 mm.; yield about 40 g.

Cuts I and II are re-distilled. From Cut I is obtained purified 5-acenaphthyltriethoxysilane, B.P. 178°–187° C./0.5 mm., which analyzes as follows:

Re-distilled Cut I product, percent: C, 67.2; H, 7.97; Si, 8.5. From Cut II is obtained purified bis(5-acenaphthyl)diethoxysilane, B.P. 293°–296° C./0.5 mm.

B. PREPARATION OF FLUORESCENT ORGANO-POLYSILOXANE RESIN

A fluorescent glass resin is likewise produced by co-hydrolysis and co-condensation of bis(5-acenaphthyl)diethoxysilane and methyltriethoxysilane.

The proportions of reactants and procedure are exactly the same as in the B portion of Example 2 with the exception that 1 g. (0.0025 mole) of bis(5-acenaphthyl) diethoxysilane is used instead of 5.1 g. (0.015 mole) of 9-phenanthryltriethoxysilane.

The cast cured discs are hard, clear, fluorescent solids that are fluorescent under U.V. light.

U.V.-fluorescent organopolysiloxane discs are similarly obtained when an equivalent molar amount of 5-acenaphthyltriethoxysilane is substituted for bis(5-acenaphthyl) diethoxysilane as a co-hydrolysis and co-condensation reactant with methyltriethoxysilane.

EXAMPLE 4.—A. PREPARATION OF BIPHENYLYLTRI-ETHOXYSILANE

|  | Wt. Used, g. | Moles Used | Approx. Molar Ratio | Solvent |
| --- | --- | --- | --- | --- |
| Lithium | 12.0 | 1.72 | 2 | 150 ml. ether. |
| Biphenylyl bromide | 200.0 | 0.86 | 1 | 800 ml. ether. |
| Ethyl orthosilicate | 269.0 | 1.29 | 1.5 |  |

The same apparatus is used as in Example 1.

Biphenylyllithium (xenyllithium),

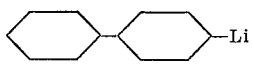

is prepared under an inert atmosphere by addition of biphenylyl bromide in ether to Li in refluxing ether. The addition is made just fast enough to keep a light reflux of ether by the heat of the reaction. The solution is refluxed for 2 hours after completion of the addition. The resulting biphenylyllithium solution is then added to the ethyl orthosilicate which is maintained at $-30°$ C. by a Dry Ice-acetone bath. The solution is allowed to warm to room temperature (20°–30° C.), and is then refluxed for 4 hours. The ether is tripped off and replaced by about 300 ml. toluene. The mixture is refluxed for 6 hours, filtered and distilled.

The product, xenyltriethoxysilane (biphenylyltriethoxysilane), has a B.P. of 147° C. under 0.5 mm. Hg pressure.

Analysis.—Found, percent: C, 69.0; H, 8.05; Si, 8.6. Theoretical, percent: C, 68.7; H, 7.6; Si, 8.9.

B. PREPARATION OF FLUORESCENT ORGANO-POLYSILOXANE RESIN

Methyltriethoxysilane (0.143 ml.; 0.75 mole), 10 grams of biphenylyltriethoxysilane, and 28 ml. of water are heated together in a 250 ml. 3-necked flask provided with a take-off tube and a coil condenser, after the mixture has first been acidified by the addition of 1 drop of 1 N HCl.

The mixture is heated to 80° C. Upon boiling, the mixture is converted to a one-phase system. The resulting reaction mass is heated under reflux for 4 hours, at the end of which period the heat is increased and 100 ml. of ethanol are removed by distillation. The residual organopolysiloxane is transferred to a 150 ml. beaker, and therein heated and stirred until the temperature reaches 140° C. in order to pre-cure the resin. The pre-cured resin is then poured into a small aluminum pan wherein a disc is formed when the resin is fully cured. The pan containing the pre-cured resin is placed in a 90° C. oven for 48 hours. At the end of this period of time a disc is obtained which is hard, clear and is fluorescent under U.V. light.

EXAMPLE 5.—A. PREPARATION OF ALPHA-NAPHTHYL-TRIMETHOXYSILANE

|  | Wt. Used, g. | Moles Used | Approx. Molar Ratio |
| --- | --- | --- | --- |
| α-Bromonaphthalene | 493 | 2.38 | 1 | 1,000 ml. of ether. |
| Lithium | 33 | 4.76 | 2 | 300 ml. of ether. |
| Silicon tetrachloride | 407 | 2.38 | 1 | 1,500 ml. of hexane. |
| Sodium methoxide | 54 | 7.15 | 3 |  |

The alpha-bromonaphthalene in ether is added to lithium wire (1 x ⅛″ pieces) in ether dropwise. The reaction solution turns dark brown with light reflux of ether upon adding the first 30 ml. of the bromonaphthalene-ether solution. The addition time is 23 hours. The reaction mixture is stirred an additional 6 hours, and is then transferred to a 2-liter addition funnel. The solution is added dropwise from the addition funnel to the hexane solution of $SiCl_4$. The time for this addition is 10 hours. The resulting reaction mass is refluxed at 36° C. for 48 hours, after which the ether is stripped off and replaced by hexane. The solution is filtered to separate the by-product salts, and the isolated salts are washed with 3 liters of boiling hexane. The solvent is then removed by distillation at atmospheric pressure, and the residue is vacuum distilled.

There is obtained 100 g. of material with a B.P. of 130° C./2 mm. and about 75 g. of material with a B.P. of 190° C./2 mm. The distillates are returned to the reaction vessel with 300 ml. hexane and 300 ml. benzene. About 100 g. of sodium methoxide is dissolved in 600 ml. of methanol, and is then added dropwise to the aforementioned contents of the reaction vessel. The solution is stirred for an additional 2½ hours, after which it is dried over $CaCl_2$ and then filtered.

The filtered solution is distilled at atmospheric pressure to remove the solvents and then under reduced pressure to obtain the following two cuts:

I. α-Naphthyltrimethoxysilane; yield, 20 g.
II. Bis(α-naphthyl)dimethoxysilane; yield, 44 g.

B. PREPARATION OF A FLUORESCENT ORGANOPOLYSILOXANE RESIN FROM ALPHA-NAPHTHYLTRIMETHOXYSILANE

Only the alpha-naphthyltrimethoxysilane is used in making the polysiloxane resin.

|  | Wt. Used, g. | Moles Used | Approx. Molar Ratio |
| --- | --- | --- | --- |
| α-Naphthyltrimethoxysilane | 17.0 | 0.069 | 1 |
| Water | 3.3 | 0.208 | 3 |

The above ingredients are heated together at 80° C. for 2½ hours. A two-phase system remains. Two drops of 12 N HCl are added, after which the reaction mixture clears in 5 minutes. The reaction mass is then refluxed for an additional 2½ hours.

A sample of the resulting condensation product is pre-cured by heating with stirring to 140° C. The pre-cured polymer is poured into an aluminum receptacle as previously described, and then placed in a 90° C. oven. After 24 hours in the oven, the material begins to thicken; and after 72 hours' additional heating at 90° C., it can no longer be poured easily. It forms a brittle solid, which fluoresces upon exposure to U.V., after heating for 3 months at 90° C. This material can be pulverized and used as a U.V.-fluorescent filler in paints, enamels and other decorative and protective coating compositions.

C. PREPARATION OF A FLUORESCENT ORGANOPOLYSILOXANE RESIN UTILIZING BIS(ALPHA-NAPHTHYL)DIMETHOXYSILANE

A 250 ml., 3-necked flask is equipped with a thermometer, magnetic stirrer and condenser that carries a take-off to allow reflux or distillation. There is charged to the flask 0.5 mole (about 95 ml.) of methyltriethoxysilane, 0.25 mole (about 61.5 ml.) of phenyltriethoxysilane, and 2.25 mole (about 40.5 ml.) of water. The resulting two-phase mixture is heated to about 80° C. and, after about 5 minutes at this temperature, a one-phase system is formed. The reaction mass is heated under reflux with stirring for 4 hours. During the last hour of reflux 19 grams (5.5 mole percent) of bis(alpha-naphthyl)dimethoxysilane is added to the reaction solution, whereupon it first turns cloudy and then clears in about 10 minutes.

At the end of the reflux period the temperature is increased, and 80% (65 ml.) of the theoretical amount of alcohol is stripped off.

The residual liquid resin is pre-cured at 140° C. as described in Examples 1–4. It is then poured into circular molds to form discs as described in the previous examples. The cast resin is cured in a 90° C. oven for 96 hours, yielding discs that are hard, clear and quite fluorescent under U.V. light.

Example 6

This example illustrates the use of a typical fluorescent organopolysiloxane of the invention not only as a casting resin to yield fluorescent molded articles but also in forming coating compositions and fluorescent coated substrates.

One (1) mole (178 g.) of methyltriethoxysilane, 3 moles (54 g.) of $H_2O$ and 0.0005 mole (0.2 g.) of bis(alpha-naphthyl)diethoxysilane are heated together to 80° C. and held at that temperature for 4 hours. Clearing of the initial two-phase system occurs after heating for about ½ hour. At the end of the reflux period 100 ml. of ethanol is stripped from the reaction mass, and the residual condensation polymer is pre-cured by heating, with stirring, on a hot plate to 140° C.

One portion of the pre-cured liquid polymer is poured into an aluminum pan and cured therein to a hard (when cold), fluorescent, molded article by heating in a 90° C. oven for 48 hours.

The remainder of the pre-cured polymer is dissolved in 100 ml. ethanol to form a coating composition comprising the fluorescent polymer. It is applied to substrates such, for example, as structural materials including wood and metals, especially metals that have been pre-treated to increase the adhesiveness of the applied coating. Examples of such metals and of other substrates, are aluminum and aluminum alloys, copper and copper alloys, iron, steel, chromium-, nickel- and tin-plated ferrous metals, stone, brick, concrete, floor tiling, wall board, counter tops, glass, ceramic materials, etc. The coating composition is applied to the substrate by spraying, brushing, dipping or other conventional techniques. The applied coating is cured in situ by evaporation of the solvent and heating at 80°–90° C. for ½ to 1 hour or more to provide a hard, fluorescent coating on the substrate.

This technique can also be used to apply decorative coatings, advertising slogans, trademark or brand names on substrates. For example, trademarks of the fluorescent coating have been applied to glass bottles by a silk screen process, and then the applied coating has been cured as described in the preceding paragraph to form a clear, hard, U.V.-fluorescent indicia on the bottle.

Example 7

This example illustrates the preparation of a fluorescent organopolysiloxane resin from cyclohexyltrimethoxysilane, methyltriethoxysilane and bis(alpha-naphthyl)diethoxysilane.

|  | Wt. Used, g. | Moles Used | Aprrox. Molar Ratio |
| --- | --- | --- | --- |
| Cyclohexyltriethoxysilane | 61.5 | 0.25 | 1 |
| Methyltriethoxysilane | 89.0 | 0.50 | 2 |
| Bis(alpha-naphthyl)diethoxysilane | 0.2 | 0.00055 |  |
| Water | 40.5 |  | 9 |

A mixture of the above ingredients to which has been added one drop of 0.1 N HCl is heated to 80° C. and held at that temperature, under reflux and with stirring, for 4 hours. The initial two-phase system clears to a one-phase system after heating for about ½ hour. At the end of the reflux period about 80% of the by-product alcohol is stripped from the solution.

The resulting condensation polymer is pre-cured by heating with stirring to 140° C. Portions of the pre-cured resin are poured into aluminum molds, which are then placed in a 90° C. oven for final cure over a 7-day period. The resulting molded articles, specifically molded discs, are hard, clear and fluoresce when exposed to U.V. light.

Example 8

Same as in Example 7 with the exception that, instead of 0.25 mole of cyclohexyltriethoxysilane, there is used 0.25 mole of n-hexyltriethoxysilane; and, in place of using 0.50 mole of methyltriethoxysilane, there is employed 0.45 mole of methyltriethoxysilane and 0.05 mole of vinyltriethoxysilane.

A disc molded from the pre-cured condensation polymer as described under Example 7 is clear, hard and fluoresces under U.V. light.

Example 9.

This example illustrates the preparation of a fluorescent organopolysiloxane from n-butyltriethoxysilane and bis(alpha-naphthyl)diethoxysilane.

|  | Wt. Used, g. | Moles Used | Molar Ratio |
|---|---|---|---|
| n-Butyltriethoxysilane | 220.3 | 1 | 1 |
| Water | 54.0 | 3 | 3 |
| Bis(alpha-naphthyl)diethoxysilane | 0.2 | 0.00055 | |

The procedure is the same as described under Example 7, yielding a resinous condensation polymer in the form of a molded disc that is hard, clear and fluorescent under U.V. light.

EXAMPLE 10.—A. PREPARATION OF BIS(ALPHA-NAPHTHYL)SILANEDIOL

|  | Wt. Used, g. | Moles used, g. | Molar Ratio | Solvent |
|---|---|---|---|---|
| α-Bromonaphthalene | 493 | 2.38 | 2 | 1,000 ml. ether. |
| Lithium | 33 | 4.76 | 4 | 150 ml. ether. |
| Silicon tetrachloride | 203 | 1.19 | 1 | 1,000 ml. benzene |

Alpha-naphthyllithium is prepared in an inert atmosphere by the dropwise addition of alpha-bromonaphthalene to stirred lithium pieces in refluxing ether. Upon completion of the addition the reaction mixture is refluxed for 4 hours. The solution of the alpha-naphthyllithium is then added dropwise to the SiCl₄ in benzene. At the end of this addition, the reaction mass is stirred for 12 hours under reflux. At the conclusion of the reaction period the ether is stripped from the solution, and the residue is filtered and distilled. There is obtained about 160 g. of bis(alpha-naphthyl)dichlorosilane, B.P. 190° C./2 mm.

The aforementioned dichlorosilane is dissolved in 800 ml. of a 1:1 ether-benzene mixture. To the resulting solution is added dropwise 0.1 N aqueous NaOH solution until the solution is red in the presence of phenolphthalein indicator. The water layer is separated and the solvents slowly evaporated from the organic layer.

Upon evaporation of all of the solvent there are obtained cubic crystals of product, which is non-fluorescent under U.V. light and which is identified by infrared examination as bis(alpha-naphthyl)silanediol.

B. PREPARATION OF ORGANOPOLYSILOXANE FROM BIS(ALPHA-NAPHTHYL)SILANEDIOL AND METHYLTRIETHOXYSILANE

|  | Wt. Used, g. | Moles Used | Molar Ratio |
|---|---|---|---|
| Methyltriethoxysilane | 178.1 | 1 | 1 |
| Bis(alpha-naphthyl)silanediol | 0.1 | 0.00034 | |
| Water | 54.0 |  | 3 |

The procedure is the same as described under Example 7. The results are substantially the same as in Example 7 and other examples with the exception that the molded discs made from the organopolysiloxane of this example are fluorescent under U.V. light only after they have been exposed to air at ambient temperature for about 2 months.

The single figure of the accompanying drawing illustrates schematically a luminescent device of the present invention, more particularly a fluorometer. Such instruments require a fluorescent standard whereby calibration can be obtained in a frequency near that of the fluorescence of the sample.

In the drawing 10 represents a source of energizing rays, e.g., a U.V. lamp. A filter for filtering out rays that are not wanted is indicated at 12. Mirrors are shown at 14, 16, 18, 20, 22 and 24. A fluorescent standard, viz., an organopolysiloxane of the kind with which this invention is concerned, is indicated at 26, while the fluorescent sample to be tested is shown at 28. The rays reflected from the mirrors 22 and 24 are directed toward the chopper 30, which is a device for giving equal times to two optical paths. One-half of this chopper, which is driven by motor 32, is mirrored while the other half is plain glass. The light passing through the chopper strikes the phototube 34 to which is connected the recording chart 36 upon which values obtained by the phototube are recorded. Instead of using a recording chart, the phototube may be connected to a potentiometer from which readings are taken.

Other articles or devices embraced by the present invention, or in which targets of the invention can be utilized, have been mentioned hereinbefore, and will be suggestive to those skilled in the art of still other applications in defense, decorative, domestic and industrial uses. Thus, they can be used in making fluorescent indoor and outdoor advertising signs, in making name and house- or building-number signs in various U.V.-fluorescent colors and intensities, in providing unique ornamental and decorative effects within the home, and in offices, stores and the like.

The cathodoluminescence of organopolysiloxanes with which this invention is concerned also suggests their suitability in TV-tube and related applications.

As will be apparent to those skilled in the art, modifications of the present invention can be made or followed in the light of the foregoing disclosure without departing from the spirit and scope of the disclosure or from the scope of the claims.

I claim:
1. The method of producing an organopolysiloxane, capable of being further cured and adapted for use as a target for converting energizing rays to luminescent emission, by the steps of

I. heating a mixture of
(A) at least one compound represented by the general formula

$$A_mSiZ_{(4-m)}$$

(B) at least one compound which is different from compound of (A) and which is represented by the general formula

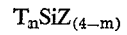

$$T_nSiZ_{(4-m)}$$

wherein each A in the first-given formula independently represents a polynuclear hydrocarbon radical having not more than 16 carbon atoms, and each T in the second given formula independently represents a member of the group consisting of alkyl, alkenyl and aryl radicals having less than 7 carbon atoms, each Z in both formulas independently represents an alkoxy group that contains from 1 through 7 carbon atoms, $m$ represents a positive integer of 1 or 2, and $n$ represents a positive integer less than 4, the amount of the compound of (A) in the said mixture being at least sufficient to impart luminescence to the ultimate organopolysiloxane but is not more than approximately 33⅓ mole percent of the total molar amount of the compounds of (A) and (B), and the molar amounts of the compounds of (A) and (B) in the said mixture and the number of alkoxy groups in each of the said compounds as determined by the values of $m$ and $n$ in their aforementioned general formulas are such that a cross-linked organopolysiloxane is obtained as the ultimate product; and
(C) from 1.5 to about 5 moles of water per mole of total silane reactant material,
said mixture containing less than 0.01 mole of acid per mole of total silane reactant material, and
the said heating of the said mixture to form a liquid siloxane partial condensation product being continued for from 1 to 10 hours at a temperature of at least about 50° C. while retaining in the reaction mass at least about 1.5 moles of alkanol by-product per mole of silane starting material assuming complete hydrolysis of all alkoxy-silicon linkages in the liquid reaction mixture;

II. concentrating the liquid partial condensation product from step I by gradually raising its temperature to a maximum temperature within the range of from 100° to 300° C. thereby to remove some but not all volatile material including alkanol by-product and some water and to obtain a liquid residue, and III. heating the concentrated liquid siloxane partial condensation product from step II at a temperature below its gelation point but not higher than about 300° C. to remove the remainder of the water and to obtain, without gelation, a more highly condensed, organic solvent-soluble, siloxane partial condensation product that is capable of being finally cured to a solid organopolysiloxane resin adapted for use as a target for converting energizing rays to luminescent emission.

2. The method as in claim 1 wherein A in the formula $A_mSiZ_{(4-m)}$ represents a napthyl radical.

3. The method as in claim 1 wherein A in the formula $A_mSiZ_{(4-m)}$ represents a phenanthryl radical.

4. The method as in claim 1 wherein A in the formula $A_mSiZ_{(4-m)}$ represents an acenaphthyl radical.

5. The method as in claim 1 wherein A in the formula $A_mSiZ_{(4-m)}$ represents a biphenylyl radical.

6. The method as in claim 1 wherein the amount of the compound of (A) in the mixture defined in I is at least sufficient to impart luminescence to the ultimate organopolysiloxane, but is not more than 10 mole percent of the total molar amount of the compounds of (A) and (B) and wherein compound (A) is selected from the group consisting of 5-acenaphthyltriethoxysilane, bis(5-acenaphthyl)diethoxysilane, 4 - biphenylyltriethoxysilane, 9-phenanthryltriethoxysilane, bis(9-phenanthryl)diethoxysilane, 1-naphthyltriethoxysilane, bis(1-naphthyl)dimethoxysilane and bis(1-naphthyl)diethoxysilane.

7. The organic solvent-soluble, siloxane partial condensation product resulting from the method of claim 1.

8. A coating composition comprising an organic solvent having dissolved therein the organic solvent-soluble, siloxane partial condensation product resulting from the method of claim 1, the amount of the said condensation product not exceeding 90 weight percent of the organic solvent solution thereof.

9. The method as in claim 1 which includes the further step of finally curing the precured siloxane partial condensation product from step III, whereby it is converted from an organic solvent-soluble, siloxane partial condensation product to its ultimate, thermoset, cross-linked form, in one of the following ways: (1) allowing it to remain at ambient temperature until substantially complete conversion to the above-described form has been attained; (2) initially heating it at a maximum temperature not exceeding about 90° C., the initial temperature during this initial portion of the final-stage cure being below the particular maximum precuring temperature employed in step III, and thereafter continuing the final-stage cure at the same temperature employed during the said initial portion of the final-stage cure, or at a higher or lower temperature, until final curing has been completed and there has been obtained a solid, cross-linked organopolysiloxane resin adapted to be used as a target for converting energizing rays to luminescent emission.

10. The solid, cross-linked organopolysiloxane resulting from the method of claim 9.

11. The method as in claim 1 wherein the (B) component of the mixture is at least one compound which is different from the compound of (A) and which is a methyltrialkoxysilane represented by the general formula

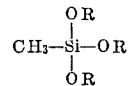

wherein R represents an alkyl radical containing less than 4 carbon atoms and from 0 to 5 mole percent, based on total silane reactant material, of at least one compound different from the above-described methyltrialkoxysilane and which is represented by the general formula

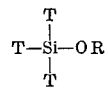

wherein R in the alkoxy radical —OR has the same meaning as in the first-given formula and each T independently represents an alkyl, aryl or alkenyl radical, each of which contains less than 7 carbon atoms, or the aforementioned alkoxy radical, —OR.

12. The method as in claim 1 wherein the (B) component of the mixture consists of compounds different from the compound of (A) and which are:
(a) a methyltrialkoxysilane having the general formula $CH_3Si(OR)_3$ wherein R in each —OR grouping represents an alkyl radical having less than 5 carbon atoms,
(b) a phenyltrialkoxysilane having the general formula $C_6H_5Si(OR)_3$ wherein R in each —OR grouping also represents an alkyl radical having less than 5 carbon atoms,
the molar ratio of the reactants of (a) and (b) being from 1:10 to 10:1, and
(c) from 0 to 10 mole percent, based on total silane reactant material, of at least one compound different from the reactants of (A), (a) and (b) and which is represented by the general formula

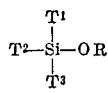

wherein $T^1$, $T^2$ and $T^3$ represent monovalent radicals independently selected from the group consisting of aryl, alkyl and alkenyl radicals containing less than 7 carbon atoms, and the alkoxy radical, —OR, wherein R in each —OR grouping represents an alkyl radical of less than 5 carbon atoms.

13. The method as in claim 11 wherein the silane component of (A) is selected from the group consisting of 5-acenaphthyltriethoxysilane, bis(5-acenaphthyl)diethoxysilane, 4-biphenylytriethoxysilane, 4-biphenylyltriethoxysilane, 9-phenanthryltriethoxysilane, bis(9-phenanthryl)diethoxysilane, 1-naphthyltriethoxysilane, bis(1-naphthyl)dimethoxysilane and bis(1-naphthyl)diethoxysilane, the methyltrialkoxysilane of (B) is methyltriethoxysilane, and the amount of the silane component of (A) is from 0.0001 to 5 mole percent based on the total molar amount of the silane components of (A) and (B).

14. The method as in claim 12 wherein the silane component of (A) is selected from the group consisting of 5-acenaphthyltriethoxysilane, bis(5-acenaphthyl)diethoxysilane, 4-biphenylyltriethoxysilane, 4-biphenylyltriethoxysilane, 9 - phenanthryltriethoxysilane, bis(9-phenanthryl)diethoxysilane, 1-naphthyltriethoxysilane, bis(1-naphthyl)dimethoxysilane and bis(1-naphthyl)diethoxysilane, the silane component of (B) consists of methyltriethoxysilane and phenyltriethoxysilane in a molar ratio of from 1:10 to 10:1, and the amount of the silane component of (A) is from 0.0001 to 5 mole percent based on the total molar amount of the silane components of (A) and (B).

References Cited

UNITED STATES PATENTS

| | | | |
|---|---|---|---|
| 2,258,222 | 10/1941 | Rochow | 260—46.5 |
| 2,458,944 | 1/1949 | Hyde | 260—46.5 |
| 2,470,562 | 5/1949 | Hyde | 260—46.5 |
| 2,501,525 | 3/1950 | Krieble et al. | 260—448.2 |
| 2,568,384 | 9/1951 | Cheronis | 260—46.5 |
| 2,832,794 | 4/1958 | Gordon | 260—448.8 |
| 3,000,858 | 9/1961 | Brown | 260—448.2 |
| 3,017,386 | 1/1962 | Brown | 260—46.5 |
| 3,090,765 | 5/1963 | Nitzsche et al. | 260—46.5 |
| 3,208,972 | 9/1965 | Lyons | 260—46.5 |
| 3,223,474 | 12/1965 | Nitzsche et al. | 260—448.8 |

OTHER REFERENCES

Eaborn, Organosilicon Compounds, Academic Press Inc., New York, pp. 227 to 235 (1960).

DONALD E. CZAJA, *Primary Examiner.*

M. I. MARQUIS, *Assistant Examiner.*

U.S. Cl. X.R.

260—32.8, 33.2, 33.4, 33.6; 117—124, 125, 135.1, 161; 250—71, 71.5; 200—46.5